2,868,769

CONDENSATION OF P-MONOAMINOMETHYL-BENZOIC ACID AND EPSILON-CAPROLACTAM

Bruce Graham, Los Altos, Calif., assignor to Ethyl Corporation, New York, N. Y., a corporation of Delaware No Drawing. Application August 16, 1954
Serial No. 450,261

1 Claim. (Cl. 260—78)

This invention relates generally to condensation polymers and more particularly to an improved copolymer of caprolactam and a process for manufacturing the same.

Poly ε-caprolactam is presently manufactured commercially for use as fibers, molded products and similar articles. While it has many highly desirable properties, the strength properties of the homopolymer leave much to be desired. In addition, the polymer has poor water sensitivity, a relatively low modulus of elasticity and is quite soft.

Copolymers of ε-caprolactam have previously been prepared in an attempt to improve these properties. While exhibiting limited success, copolymers with hexamethylene diamine, adipic acid and sebacic acid have proved the most promising. However, these copolymers, like the homopolymer, have an extremely low modulus of elasticity, poor resistance to water and solvents, a relatively low melting point and heat distortion temperature (normally below that of the homopolymer).

It is accordingly an object of this invention to provide an improved polymeric material and method for producing the same. Another object is to provide an improved copolymer of ε-caprolactam which has a high water insensivity. Another object is to provide a copolymer of ε-caprolactam having a high melting point which copolymer is capable of being varied to give products having melting points over a wide range. Still another object of the present invention is to provide a copolymer of the above type which has a high melt viscosity in which the viscosity thereof changes only gradually with variations in temperature. Other objects and advantages will become more apparent from the following description and appended claims.

I have now found that when ε-caprolactam is condensed with an aminoalkylbenzoic acid, or derivatives thereof that the resulting polymeric product has exceptional heat and light stability, and, at the same time, has an unexpected improvement in strength characteristics over poly ε-caprolactam or known copolymers thereof. These condensation polymers also have unusually desirable high melting points, frequently being higher than the homopolymer of caprolactam.

While aromatic diamines, such as diaminobenzoic acids, have previously been copolymerized with ε-caprolactam, the resulting products are very unstable polymers, being particularly water and heat sensitive. In contrast, the aminoalkylbenzoic acid copolymers of this invention are highly stable polymers and, in addition, have exceptional strength properties which make them particularly suitable for molding resins, fibers, coatings, and other uses.

One of the most significant and unusual feaaures of the polymers of the present invention is that a very wide range of melting point polymers can be obtained by varying the proportions of the aminoalkylbenzoic acid. Thus, polymer compositions can be readily prepared in accordance with this invention which are tailored to the most desired fabricating operations or to the requirements of the final use of the polymer.

Of the aminoalkylbenzoic acids, the mono amino derivatives are preferred for most applications since they do not tend to crosslink the polymer molecule and another acid is not necessary to react with the addition amine groups. Also, it is preferred to employ omega substituted amino acids. Accordingly, it is preferred to employ a p-monoaminoalkylbenzoic acid of the general formula

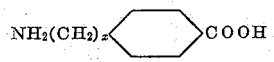

wherein $x$ is an integer from 1 to 5 inclusive. Typical examples are p-monoaminomethylbenzoic acid, p-monoaminoethylbenzoic acid, p-monoamino n-propylbenzoic acid, p-monoaminobutylbenzoic acid, and p-monoaminoamylbenzoic acid. Other monoaminobenzoic acids having a higher alkyl group can be employed although the monomers are more difficult to prepare and, in general, give lower melting point polymers than the preferred group noted above.

In addition to using ε-caprolactam, other derivatives thereof can be employed, such as omega amino caproic acid or esters thereof, including methyl, ethyl and other aliphatic esters up to about $C_5$, and aromatic esters, e. g., phenyl.

The proportion of the aminoalkylbenzoic acid to the ε-caprolactam can be varied within broad limits. In general, it has been found desirable to employ between 5 and 75 weight percent of the aminoalkylbenzoic acid with from 95–25 percent of ε-caprolactam. A more preferred range of the aminoalkylbenzoic acid is between about 10–50 percent. Greater concentrations of either component gives a product having many of the undesirable properties of the individual components and minimizes the unique properties resulting from the copolymerization, particularly the strength and water resistivity properties which are lacking in poly ε-caprolactam and other known copolymers thereof.

The process of this invention for condensing the ε-caprolactam and the p-monoaminoalkylbenzoic acid is carried out by placing the monomers in distilled water in a pressure autoclave, preferably glass lined. The charge is then heated under an inert atmosphere, such as nitrogen, to a temperature between about 200–300° C., preferably between 225 and 300° C. The initial pressure of the nitrogen or other inert atmosphere is frequently between about 50–100 p. s. i. Following heating of the autoclave, the internal pressure in the autoclave normally ranges from about 200 to 400 p. s. i., preferably between 225 to 300 p. s. i., and is employed to contain the water of reaction within the autoclave. Thereafter, the pressure is slowly lowered to atmospheric pressure over a period ranging from about one to eight hours, while the temperature of the reaction mass is raised somewhat, generally by about 10–50° C. Thereafter, the charge is maintained at this higher temperature for up to about one to five hours while subjecting the same to a vacuum frequently less than one millimeter to distill off the low polymers and unreacted constituents. The latetr heating period is not always necessary but is employed as a safety precaution to assure complete condensation by complete removal of water, monomers and low polymers.

The following examples illustrate the present invention but should not be construed as limiting the same. All parts given in these examples are parts by weight.

Example 1

Equal parts by weight of ε-caprolactam (5 parts—57.2 mole percent) and p-aminomethylbenzoic acid (5 parts—42.8 mole percent) were placed in 10 parts of distilled water in a glass lined stainless steel autoclave. The autoclave was purged with nitrogen under a pressure of 80 p. s. i. and the charge was thereafter heated in the nitrogen atmosphere until the temperature reached 250° C. At this point, the internal pressure of the bomb was 250 p. s. i. The pressure was thereafetr slowly lowered to atmospheric pressure over a period of two hours while the temperature was raised to 265° C. The charge was then maintained at this temperature for 30 minutes while subjecting the same to vacuum of less than one millimeter of mercury.

The product (8 parts) had a softening point of between 220°–230° C., compared with poly $\epsilon$-caprolactam which when similarly condsensed has a melting point between 176–182° C. Purification of the polymer will raise the melting points of both polymers from 10–30° C. The polymer product of this example had exceptional strength characteristics and had a good modulus of elasticity. The heat distortion temperature of the polymer was materially above that of poly $\epsilon$-caprolactam. The product was tough, hard, opaque and white. The copolymer product could be readily molded or drawn into fibers and was highly resistant to moisture, heat and light.

*Example II*

Example I was repeated except that only 13 parts (10 mole percent) of p-aminomethylbenzoic acid was employed with 81 parts (90 mole percent) of $\epsilon$-caprolactam. The product which is obtained was tough, pliable and opaque. The polymer had good resistance against light, heat and water. The softening point of the product was 190° C. and the sticking temperature was 190–193° C.

*Example III*

Example I was repeated except that 31 parts (25 mole percent) of the p-monoaminomethylbenzoic acid was copolymerized with 69 parts (75 mole percent) of $\epsilon$-caprolactam. The product was similar to that of Example II, except that its softening point was 180° C. and its sticking temperature was 182–184° C.

*Example IV*

Example I was repeated except that 42 parts (35 mole percent) of the p-monoaminomethylbenzoic acid was copolymerized with 58 parts (65 mole percent) of $\epsilon$-caprolactam. The product was similar to that of Example II, except that its softening point was 180° C. and its sticking temperature was 184–186° C.

*Example V*

Example I was repeated except that 57.4 parts (50 mole percent) of the p-monoaminomethylbenzoic acid was copolymerized with 42.6 parts (50 mole percent) of $\epsilon$-caprolactam. The product was similar to that of Example II, except that its softening point was 220° C. and its sticking temperature was 224–226° C.

*Example VI*

Example I is repeated except that p-monoaminoethylbenzoic acid and p-monoaminoamylbenzoic acid are substituted for the p-aminomethylbenzoic acid. The polymers obtained are similar to those obtained in the above examples.

As is believed apparent from the foregoing, the present invention provides a materially improved polymeric material of $\epsilon$-caprolactam which, in contrast to prior known polymers, has exceptional light, heat and water insensitivity and also has materially and unexpectedly improved strength properties over polymers of $\epsilon$-caprolactam or known copolymers thereof. Thus, the present invention permits the formation of highly useful and valuable polymeric compositions from the relatively cheap and available $\epsilon$-caprolactam, which polymers are exceptionally suitable for the manufacture of molded products as well as fibers, coatings and similar uses.

I claim:

A moldable condensation product characterized by having a relatively high resistivity to water, heat and light of substantially equal molar proportions of p-monoamino methylbenzoic acid and $\epsilon$-caprolactam, said p-monoaminomethylbenzoic acid and said $\epsilon$-caprolactam being condensed at a temperature between about 200°–300° C. under pressure and in an inert atmosphere in the presence of water.

References Cited in the file of this patent

UNITED STATES PATENTS 2,071,253    Carothers _____ Feb. 16, 1937

FOREIGN PATENTS 885,694    France _____ June 7, 1943